United States Patent [19]

Suzuki

[11] Patent Number: 5,871,417
[45] Date of Patent: Feb. 16, 1999

[54] CONTINUOUSLY VARIABLE TRANSMISSION CONTROL APPARATUS

[75] Inventor: Yutaka Suzuki, Atsugi, Japan

[73] Assignee: Nissan Motor Co., Ltd., Yokohama, Japan

[21] Appl. No.: 782,805

[22] Filed: Jan. 13, 1997

[30] Foreign Application Priority Data

Jan. 16, 1996 [JP] Japan .................................. 8-004810

[51] Int. Cl.$^6$ ................................................ F16H 59/36
[52] U.S. Cl. ................................ 477/43; 477/37; 477/46
[58] Field of Search ................................ 477/37, 44, 46, 477/48, 43; 74/335, 336 R

[56] References Cited

U.S. PATENT DOCUMENTS

| 4,836,056 | 6/1989 | Nakawaki et al. | 477/43 |
| 5,609,544 | 3/1997 | Lardy et al. | 477/46 |
| 5,655,991 | 8/1997 | Lardy et al. | 477/46 |

FOREIGN PATENT DOCUMENTS

| 60-26847 | 2/1985 | Japan . | |
| 363145138 | 6/1988 | Japan | 477/46 |
| 405332426 | 12/1993 | Japan | 477/46 |

*Primary Examiner*—Charles A. Marmor
*Assistant Examiner*—Ankur Parekh
*Attorney, Agent, or Firm*—Foley & Lardner

[57] ABSTRACT

A shift control apparatus for use with a continuously variable transmission operable at a speed ratio changed in a plurality of steps for transmitting a drive from the engine to the vehicle wheels. The shift control apparatus is operable in the manual shift control mode for producing an upshift command in response to a driver's upshift demand and a downshift command in response to a driver's downshift demand. An upshift is produced from a current speed ratio to another speed ratio one step higher than the current speed ratio in response to the upshift command and a downshift from the current speed ratio to another speed ratio one step lower than the current speed ratio in response to the downshift command. The transmission speed ratio is corrected to keep the engine speed at or below a predetermined acceptable value. An upper vehicle speed limit value is set for each of the speed ratios to provide a greater first upper vehicle speed limit value for a higher speed ratio. The shift control apparatus is arranged to produce an upshift from the current speed ratio to another speed ratio one step higher than the current speed ratio when the engine speed is at the acceptable value and the vehicle speed exceeds the upper vehicle speed limit value.

4 Claims, 8 Drawing Sheets

CONTINUOUSLY VARIABLE TRANSMISSION CONTROL APPARATUS

BACKGROUND OF THE INVENTION

This invention relates to an apparatus for controlling a continuously variable transmission for use with an automotive vehicle to change the transmission speed ratio in a plurality of steps.

For example, Japanese Patent Kokai No. 60-26847 discloses an apparatus for controlling a continuously variable transmission operable at a speed ratio changed in a plurality of steps. The transmission control apparatus operates in an automatic mode to drive the transmission at a target or desired speed ratio i* calculated in terms of vehicle speed and throttle position (or accelerator position) and also in a manual mode to drive the transmission at a speed ratio determined in response to a driver's demand. If the driver continues to depress the accelerator pedal with the transmission speed ratio determined in the manual mode, however, the engine speed would exceed an acceptable range and provide a sense of incompatibility to the driver. In order to eliminate such an undesirable tendency, the transmission control apparatus is arranged to perform an automatic correction of the transmission speed ratio to another speed ratio so as to decrease the engine speed. This is effective to perform continuous transmission speed ratio changes without a sense of incompatibility to the driver. It is now assumed that a transmission speed ratio i(1) (first speed) is selected in the manual mode. When the engine speed increases above the acceptable range, the automatic correction is performed to change the transmission speed ratio i(n) from the current speed ratio i(1) to another speed ratio so as to permit a vehicle speed increase while keeping the engine speed at or below the acceptable value. If the automatic correction produces an upshift to the speed ratio i(3), however, the driver's operation of the shift lever to produce an upshift from the current speed ratio i(1) to the smaller speed ratio i(2) (second speed) one step higher than the current speed ratio i(1) will be ignored. As a result, a sense of incompatibility will be provided to the driver.

SUMMARY OF THE INVENTION

It is a main object of the invention to provide a continuously variable transmission control apparatus which can perform smooth transmission speed ratio changes according to the driver's demand.

There is provided, in accordance with the invention, an apparatus for controlling a continuously variable transmission for use with an automotive vehicle including an engine and wheels. The transmission is operable at speed ratio changed in a plurality of steps for transmitting a drive from the engine to the wheels. The shift control apparatus comprises sensor means for sensing vehicle operating conditions including engine speed and vehicle speed, means operable in the manual shift control mode for producing an upshift command in response to a driver's upshift demand and a downshift command in response to a driver's downshift demand, means for producing an upshift from a current speed ratio to another speed ratio one step higher than the current speed ratio in response to the upshift command and a downshift from the current speed ratio to another speed ratio one step lower than the current speed ratio in response to the downshift command, means for correcting the transmission speed ratio to keep the engine speed at or below a predetermined acceptable value, means for setting an upper vehicle speed limit value for each of the speed ratios to provide a greater upper vehicle speed limit value for a higher speed ratio, and means for producing an upshift from the current speed ratio to another speed ratio one step higher than the current speed ratio when the engine speed is at the acceptable value and the vehicle speed exceeds the upper vehicle speed limit value set for the current speed ratio.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
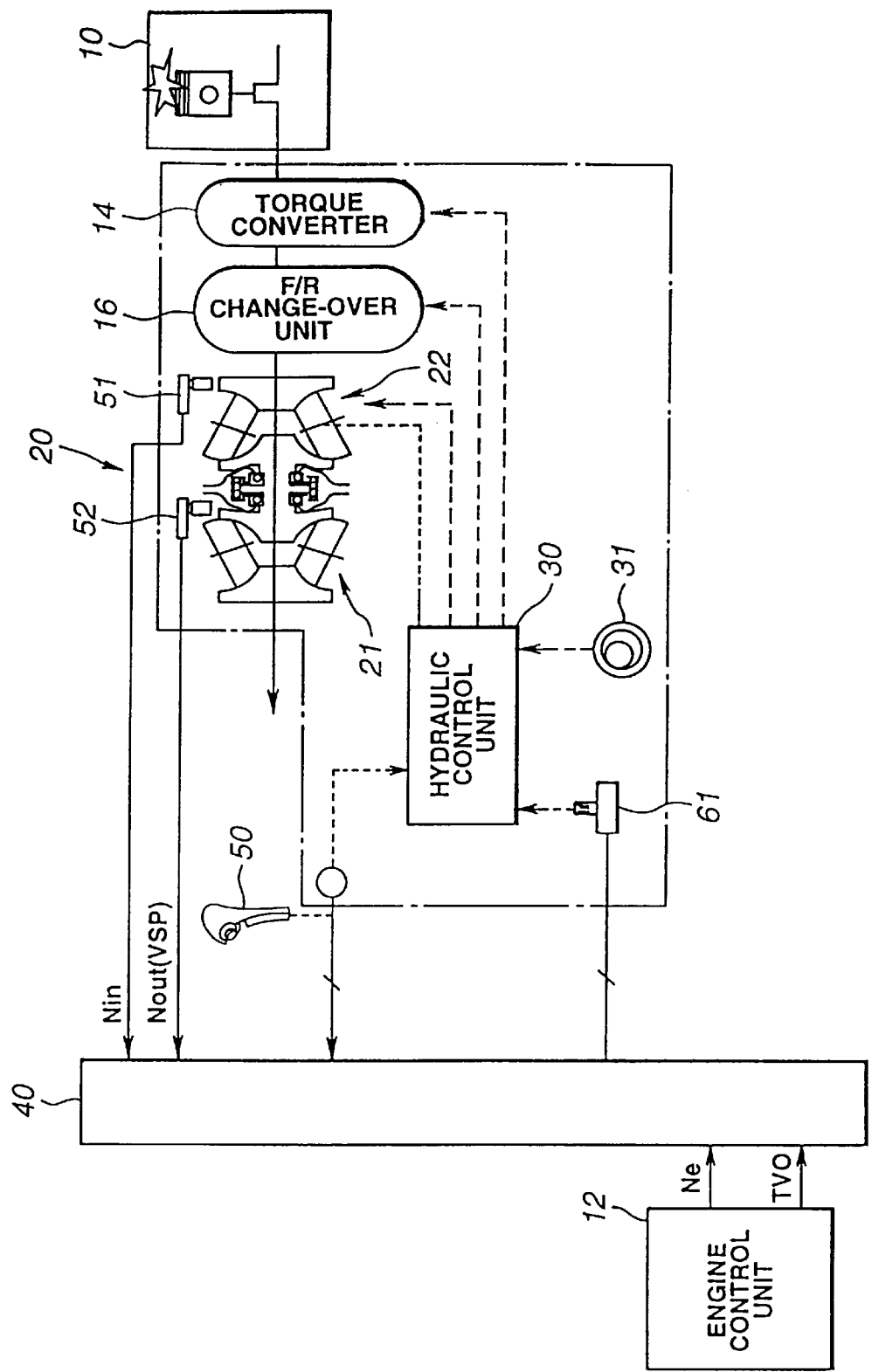
FIG. 1 is a schematic block diagram showing one embodiment of a continuously variable transmission control apparatus made in accordance with the invention.

With reference to the drawings, and in particular to FIG. 1, there is shown a continuously variable transmission control apparatus for use with an automotive vehicle having an engine 10. The engine 10 operates on command from an engine control unit 12 which controls the amount of fuel metered to the engine 10, the fuel injection timing and the ignition-system spark-timing. For example, the amount of fuel metered to the engine, this being determined by the width of the electrical pulses applied to the fuel injector, is repetitively determined from calculations performed in the engine control unit 12 based on various conditions of the engine 10 that are sensed during its operation. These sensed conditions include cylinder head coolant temperature, ambient temperature, throttle position, engine load, engine speed, etc. The calculated value for the fuel injection pulse width is transferred to set the fuel injector according to the calculated value therefor. A drive from the engine 10 is transmitted through a torque converter 14 to a continuously variable transmission 20 and hence to the vehicle wheels. The torque converter 14 includes a lockup clutch operable to complete a mechanical connection of the transmission 20 to the engine 10 when the engine speed exceeds a predetermined value. A forward/reverse (F/R) change-over unit 16, which is provided between the torque converter 14 and the transmission 20, operates to change the direction of the rotation transmitted from the engine 10 to the transmission 20. The illustrated transmission 20 is of the toroidal type including two power rollers 21 and 22 provided for inclination at a variable angle. The angle of inclination of the power rollers 21 and 22 is controlled for continuous speed ratio variations in the transmission 20.

Figure 2:
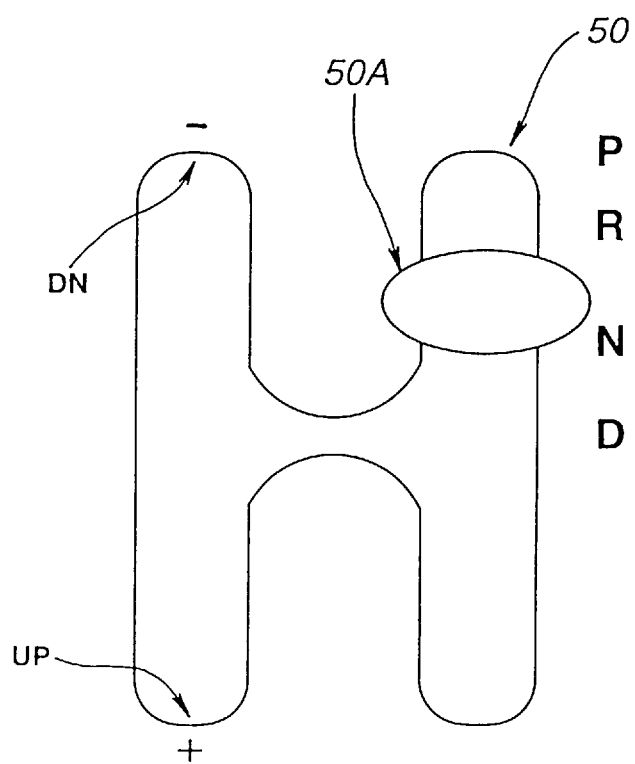
FIG. 2 is a schematic diagram showing a selector switch used in the transmission control apparatus of FIG. 1.

The torque converter 14, the F/R change over unit 16 and the transmission 20 operate on command in the form of oil pressures introduced thereto from a hydraulic actuator 30. The hydraulic actuator 30 receives an oil pressure from an oil pump 31 and adjusts the oil pressures to operate the respective components 14, 16 and 20. This operation is performed base on a command fed to the hydraulic actuator from the shift control unit 40. The shift control unit 40 calculates a target speed ratio value i* repetitively from calculations performed therein based on various conditions of the automotive vehicle that are sensed during its operation. These sensed conditions include selector position, engine speed Ne, throttle position TV0, input shaft speed Nin and output shaft speed Nout. Thus, a selector switch 50, an engine speed sensor, a throttle position sensor, an input shaft rotation sensor 51 and an output shaft rotation sensor 52 are connected to the speed ratio control unit 40. The selector switch 50 is associated with a shift lever 50A mounted for manual movement within an H-shaped gate to one of four positions, Parking (P), Reverse (R), Neutral (N) and Drive (D), as shown in FIG. 2. The selector switch 50 also has upshift and downshift switches UP and DN. The upshift switch UP is turned on to produce an upshift command to the shift control unit 40, causing an upshift in the transmission 20 with respect to the present speed ratio (or shift position) when the shift lever 50A is moved to push the upshift switch UP. Similarly, the downshift switch DN is turned on to produce an downshift command to the shift control unit 40, causing a downshift in the transmission 20 with respect to the present speed ratio (or shift position) when the shift lever 50A is moved to push the downshift switch DN. The engine speed sensor is provided for producing a pulse signal having a repetition rate proportional to the speed Ne of rotation of the engine. The throttle position sensor may be a potentiometer associated with the throttle valve situated in the induction passage of the engine 10 and connected in a voltage divider circuit for supplying a voltage proportional to the degree TV0 of opening of the throttle valve. In the illustrated case, the shift control unit 40 obtains the information on the vehicle speed Ne and the throttle position TV0 from the engine control unit 12. The input shaft rotation sensor 51 is located for producing a pulse signal of a repetition rate proportional to the speed Nin of rotation of the input shaft of the transmission 20. The output shaft rotation sensor 52 is located for producing a pulse signal of a repetition rate proportional to the speed Nout of rotation of the output shaft of the transmission 20. The shift control unit 40 derives vehicle speed VSP by multiplying a predetermined value by the output shaft speed Nout.

The shift control unit 40 produces a command signal to a step motor 61 which thereby causes the pressure actuator 30 to incline the power rollers 21 and 22 at an angle corresponding to the calculated target speed ratio value i*.

Figure 3:
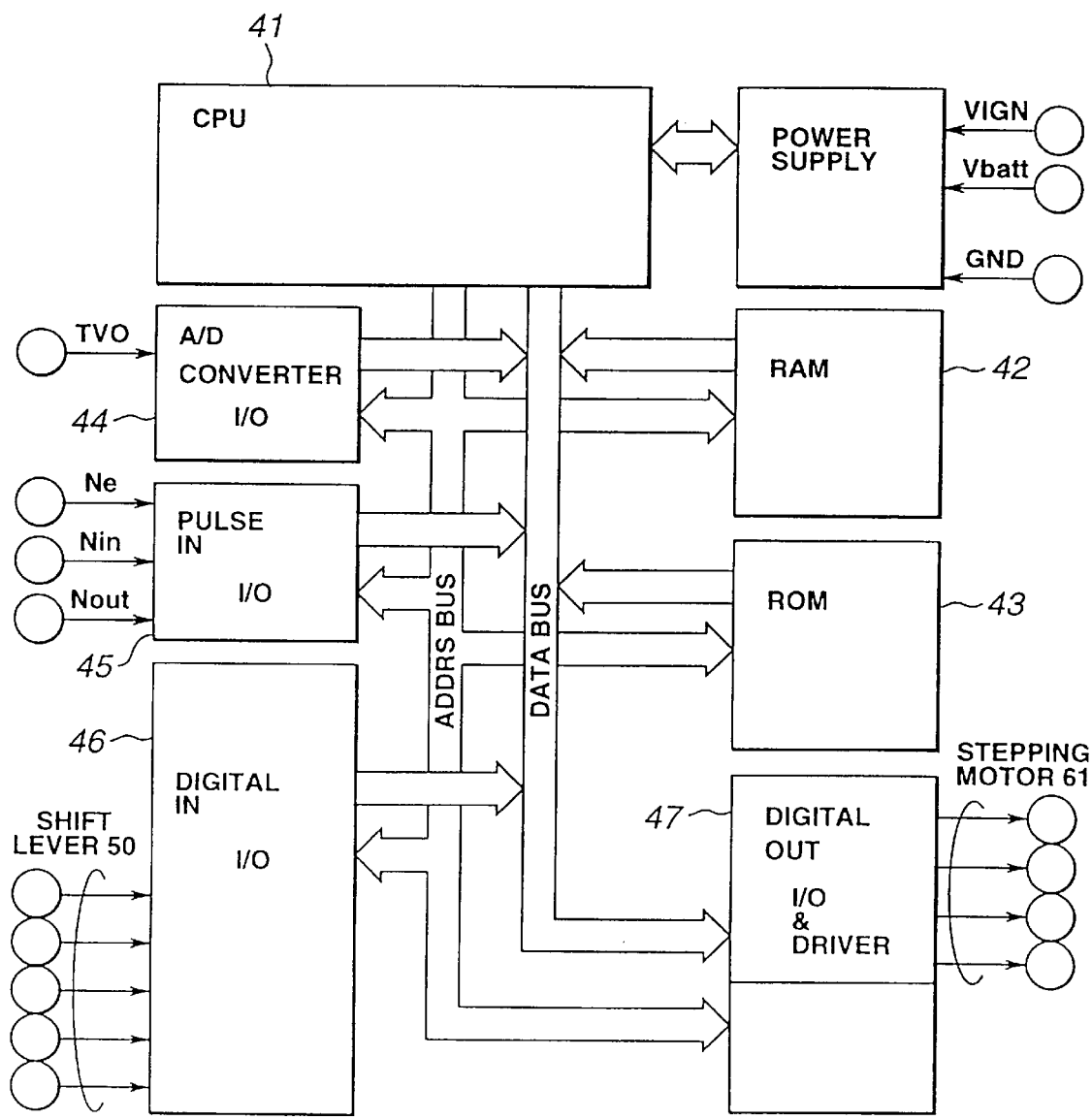
FIG. 3 is a schematic diagram showing the detailed arrangement of the shift control unit of FIG. 1.

Referring to FIG. 3, the shift control unit 40 employs a digital computer which includes a central processing unit (CPU) 41, random access memory (RAM) 42, a read only memory (ROM) 43, an analog to digital converter (A/D Converter) 44, a pulse input control unit (Pulse IN I/O) 45, a digital input control unit (Digital IN I/O) 46, and a digital output control unit (Digital OUT I/O) 47. The central processing unit 41 communicates with the rest of the computer through a data bus. The analog to digital converter 41 receives analog signals from the throttle position sensor and other sensors and converts them into digital form for application to the central processing unit. The pulse input control unit 45 includes counters which count pulses fed thereto from the speed sensors and converts the counts into corresponding speed indication digital signals for application to the central processing unit 41. The digital output control unit 46 receives signals fed thereto from the selector switch 50. The read only memory 43 contains the programs for operating the central processing unit and further contains appropriate data in look up tables used in calculating appropriate target speed ratio values. For example, the read only memory 43 stores a shift schedule (not shown) used in calculating a target speed ratio value in an automatic mode (when the shift lever is at the D position) and also a shift schedule (FIG. 4) used in calculating a target speed ratio value in a manual mode (when the shift lever is moved to push the UP or DN switch). The calculated target speed ratio value is transferred to the digital output control unit 47 which thereby causes a stepper motor drive circuit to make a change in the position of the stepper motor 61 if this is required.

Figure 5:
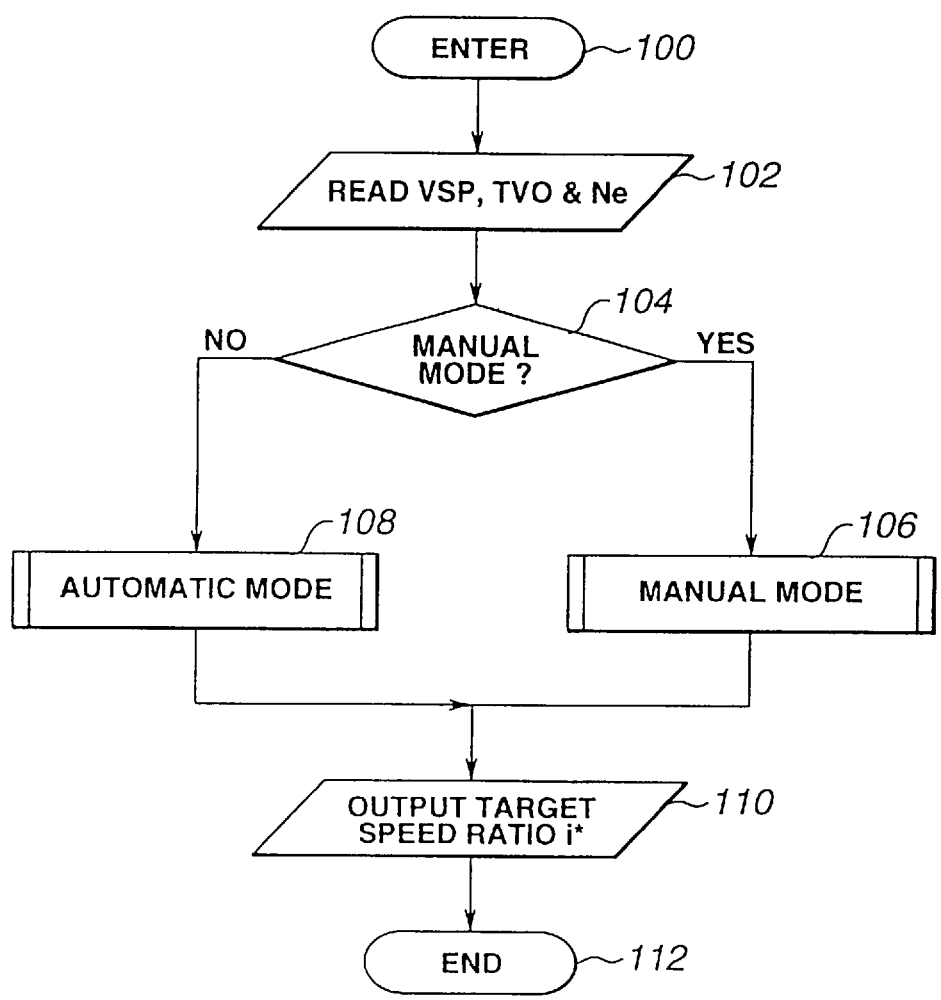
FIG. 5 is a flow diagram illustrating the programming of the digital computer as it is used to control the continuously variable transmission.

FIG. 5 is a flow diagram illustrating the programming of the digital computer as it is used to control the continuously variable transmission 20. The computer program is entered at the point 100 at uniform intervals of time, for example, 10 msec. At the point 102 in the program, various vehicle operating conditions are read into the computer memory. The vehicle operating conditions include vehicle speed VSP, the throttle position (or accelerator position) TV0, the input shaft speed Nin, the output shaft speed Nout and the selector switch position. At the point 104, a determination is made as to whether or not the shift lever 50a is positioned to specify a manual mode. If the answer to this question is "yes", then the program proceeds to the point 106 where the manual mode shift control is performed. Otherwise, the program proceeds to the point 108 where the automatic mode shift control is performed. At the point 110 in the program, the calculated target speed ratio value i* is transferred through the data bus to the driver which thereby changes the position of the stepper motor 61 so as to set the speed ratio according to the calculated value i* therefor. Following this, the program proceeds to the end point 112.

Figure 4:
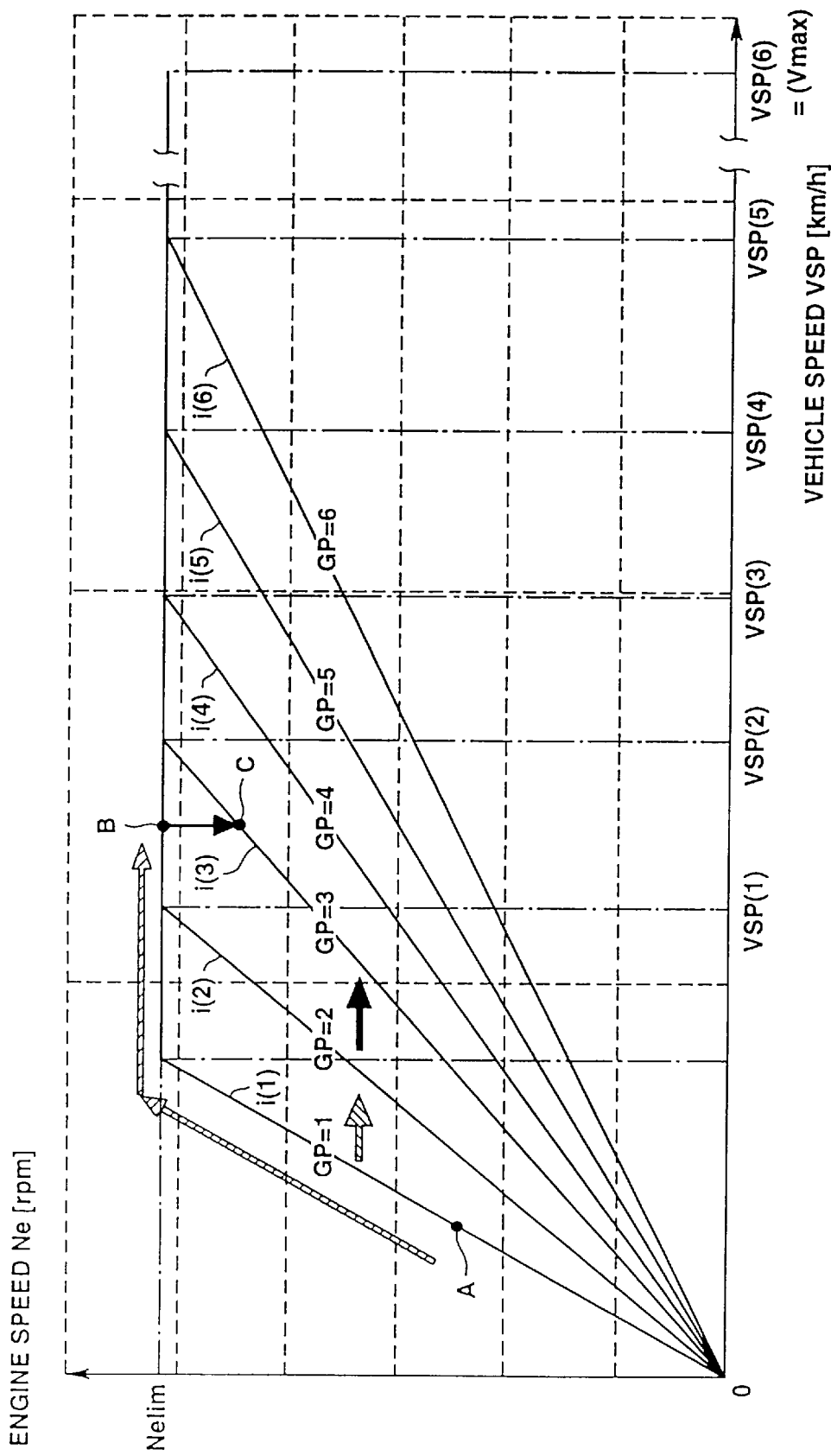
FIG. 4 is a graph showing a shift schedule used in the shift control unit of FIG. 1 to determine a desired transmission shift ratio in terms of vehicle speed and engine speed.
Figure 6:
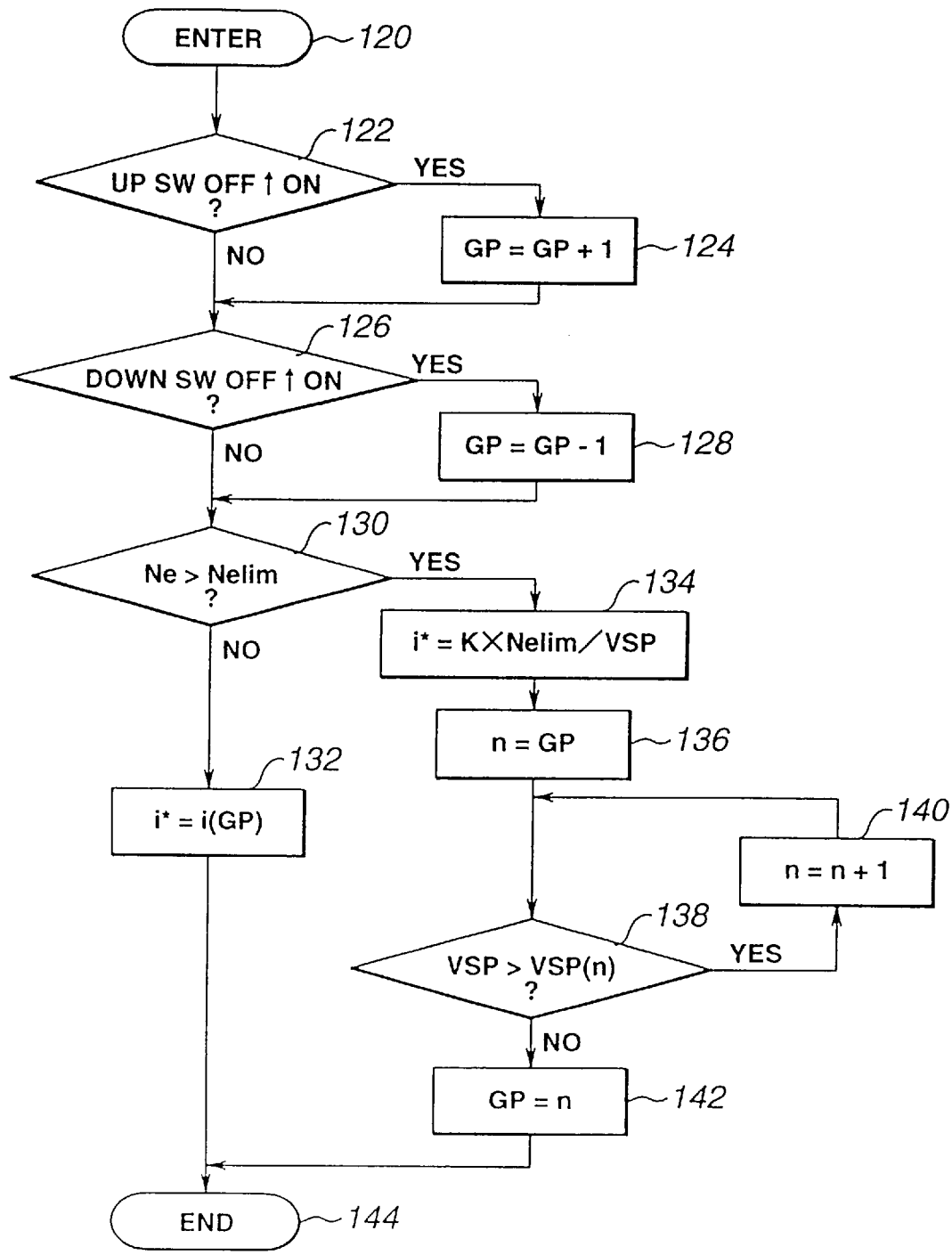
FIG. 6 is a flow diagram illustrating the manual mode shift control performed for the continuously variable transmission.

FIG. 6 is a flow diagram illustrating the above manual mode shift control performed for the automatic transmission 20. At the point 120 in FIG. 6, which corresponds to the point 106 of FIG. 5, the computer program is entered. At the point 122, a determination is made as to whether or not the shift lever 50A is operated to change the upshift switch UP from the OFF state to the ON state. If the answer to this question is "yes", then the program proceeds to the point 124 where the current speed ratio is changed to another speed ratio (GP+1) one step higher than the current speed ratio (GP) and then to the point 126. The shift schedule shown in FIG. 4 provides six forward speeds from the first speed GP=1 to the sixth speed GP=6. Otherwise, the program proceeds from the point 122 to the point 126. At the point 126, a determination is made as to whether or not the shift lever 50a is operated to change the down switch DN from the OFF state to the ON state. If the answer to this question is "yes", then the program proceeds to the point 128 where the current speed ratio is changed to another speed ratio (GP−1) one step lower than the current speed ratio (GP) and then to the point 130. Otherwise, the program proceeds to the point 130. At the point 130, a determination is made as to whether or not the engine speed Ne is higher than a predetermined acceptable value Nelim. If the answer to this question is "no", then the program proceeds to the point 132 where the target speed ratio i* is set at a speed ratio value i(GP) corresponding to the speed ratio GP demanded by the driver's operation of the shift lever 50A. Following this, the program proceeds to the end point 144.

If the engine speed Ne is equal to or higher than the predetermined acceptable value Nelim, then the program proceeds to the point 134 where the central processing unit calculate a target speed ratio value i* as i*=K×Nelim/VSP where K is a predetermined value K, Nelim is the predetermined acceptable engine speed value and VSP is the sensed vehicle speed value. At the point 136, a variable n is is set at the current speed ratio GP. At the point 138 in the program, a determination is made as to whether or not the sensed vehicle speed value VSP is higher than an upper limit VSP(n) determined by the current speed ratio GP. If the answer to this question is "yes", then the program proceeds to the point 140 where one is added to the variable n so as to increase the speed ratio GP by one step and then the program is returned to the point 138. Otherwise, the program proceeds to the point 142 where the variable n is used to the speed ratio GP again. Following this, the program proceeds to the end point 144.

In this embodiment, when the engine speed Ne exceeds the predetermined acceptable value Nelim during the manual mode shift control, the shift control unit automatically changes the shift position GP according to the vehicle speed VSP by changing the transmission speed ratio i one by one in a manner to maintain the engine speed Ne at the predetermined acceptable value Nelim. The upper vehicle speed limit value VSP(n) (VSP(1) to VSP(6)) is set at a vehicle speed value VSP where the engine speed Ne reaches the predetermined acceptable value Nelim at the speed ratio (GP+1) one step higher than current speed ratio (GP), as shown in FIG. 4. For example, the upper vehicle speed limit value VSP(1) for the first speed i(1) is set at a vehicle speed value VSP where the engine speed Ne reaches the predetermined acceptable value Nelim at the speed ratio one step higher than the speed ratio i(1), that is, the second speed i(2). Assuming now that the engine speed Ne increases to the acceptable value Nelim with the speed ratio selected at the first speed GP=1, an upshift is produced from the speed ratio GP=1 to the speed ratio one step higher than the speed ratio GP, that is, the second speed GP=2 when the vehicle speed VSP reaches the upper vehicle speed limit VSP(1).

When the engine speed is equal to or less than the acceptable value Nelim, the target speed ratio i* (GP) is set based on the shift position GP determined by the operation of the shift lever 50A. When the engine speed Ne reaches the acceptable value Nelim, the target speed ratio i* is set at such a value as to maintain the engine speed Ne at the acceptable value Nelim. In this case, changes up are automatically produced one by one, according to the vehicle speed increase, to maintain the vehicle speed VSP remain below the upper vehicle speed value VSP(n). It is now assumed that the driver continues to depress the accelerator pedal from the shift position indicated by the point A of FIG. 4. The vehicle speed VSP increases as the engine torque increases. When the engine speed Ne reaches the acceptable engine speed value Nelim, the shift control unit 40 changes the target speed ratio i* one by one to keep the engine speed Ne at or below the acceptable engine speed value Nelim (point 134). If the driver continues to depress the accelerator pedal without operating the shift lever 50A until the speed ratio is changed to the speed ratio by the point B of FIG. 4, the vehicle speed VSP will increase as the target speed ratio i* changes according to the acceptable engine speed value Nelim. When the vehicle speed VSP reaches the upper vehicle speed value VSP(1), the speed ratio is changed to the second speed (GP=2) even though the driver does not operate the shift lever 50A. In this case, the target speed ratio i* is changed one by one to a value substantially intermediate the second and third speeds so as to maintain the engine speed at the acceptable value Nelim.

When the driver operates the shift lever 50A to turn the upshift switch UP from the OFF state to the ON state at the speed ratio indicated by the point B of FIG. 4, the speed ratio can be changed from the second speed GP=2 to the third speed GP=3 indicated by the point C of FIG. 4. If the driver continues to depress the accelerator pedal in the manual mode, the speed ratio GP is shifted one by one as the vehicle speed VSP increases while the transmission 20 corrects the target speed ratio i* to keep the engine speed Ne at or below the acceptable value Nelim. Thus, the speed ratio GP can be increased actually even though the driver operates the shift lever 50A to produce a upshift at any time. It is, therefore, possible to achieve good and smooth manual mode shift control according to the driver's intention without providing a feel of incompatibility or unpleasantness to the driver.

Figure 7:
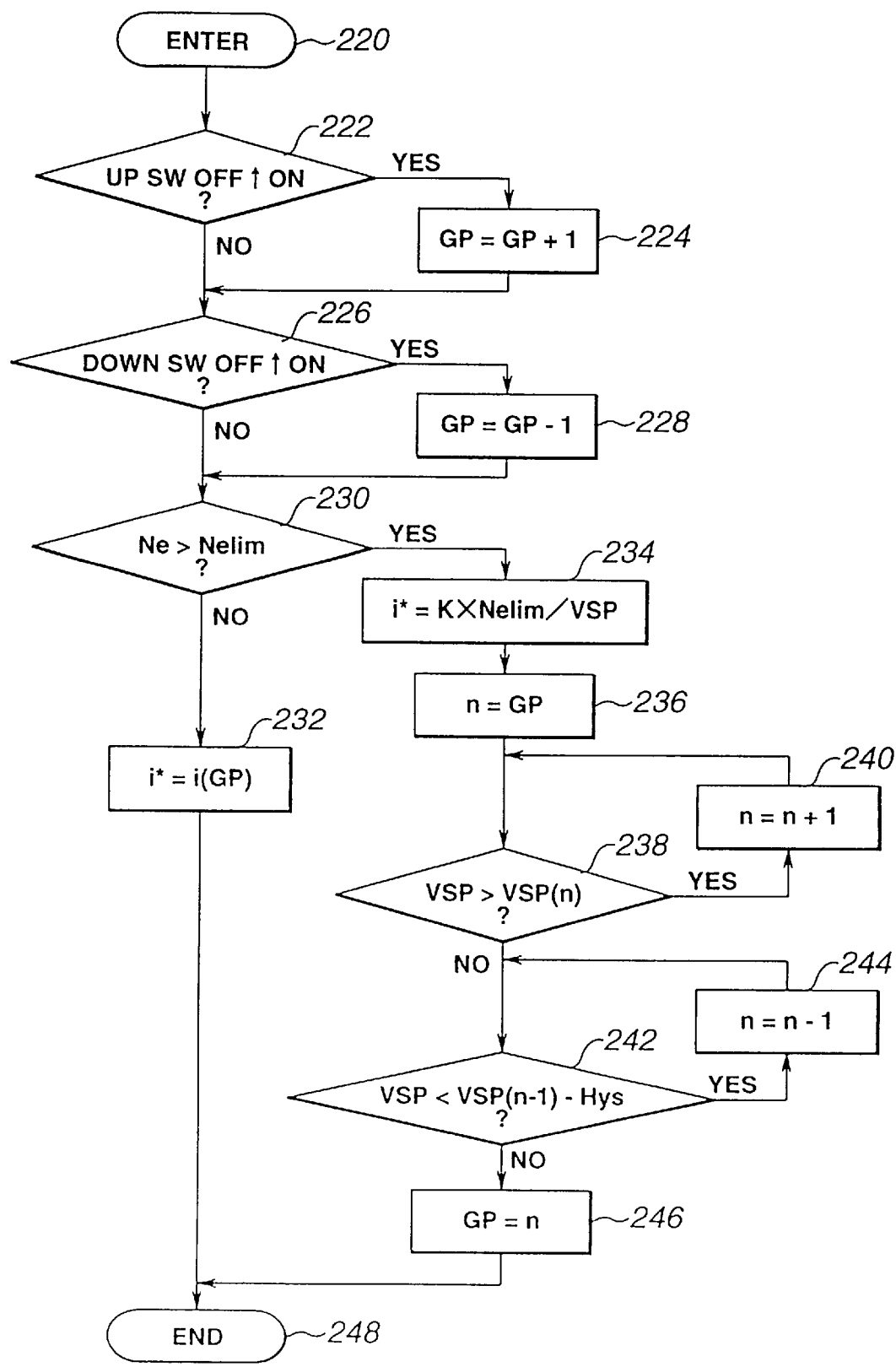
FIG. 7 is a flow diagram illustrating a modified form of the manual mode shift control performed for the continuously variable transmission.
Figure 8:
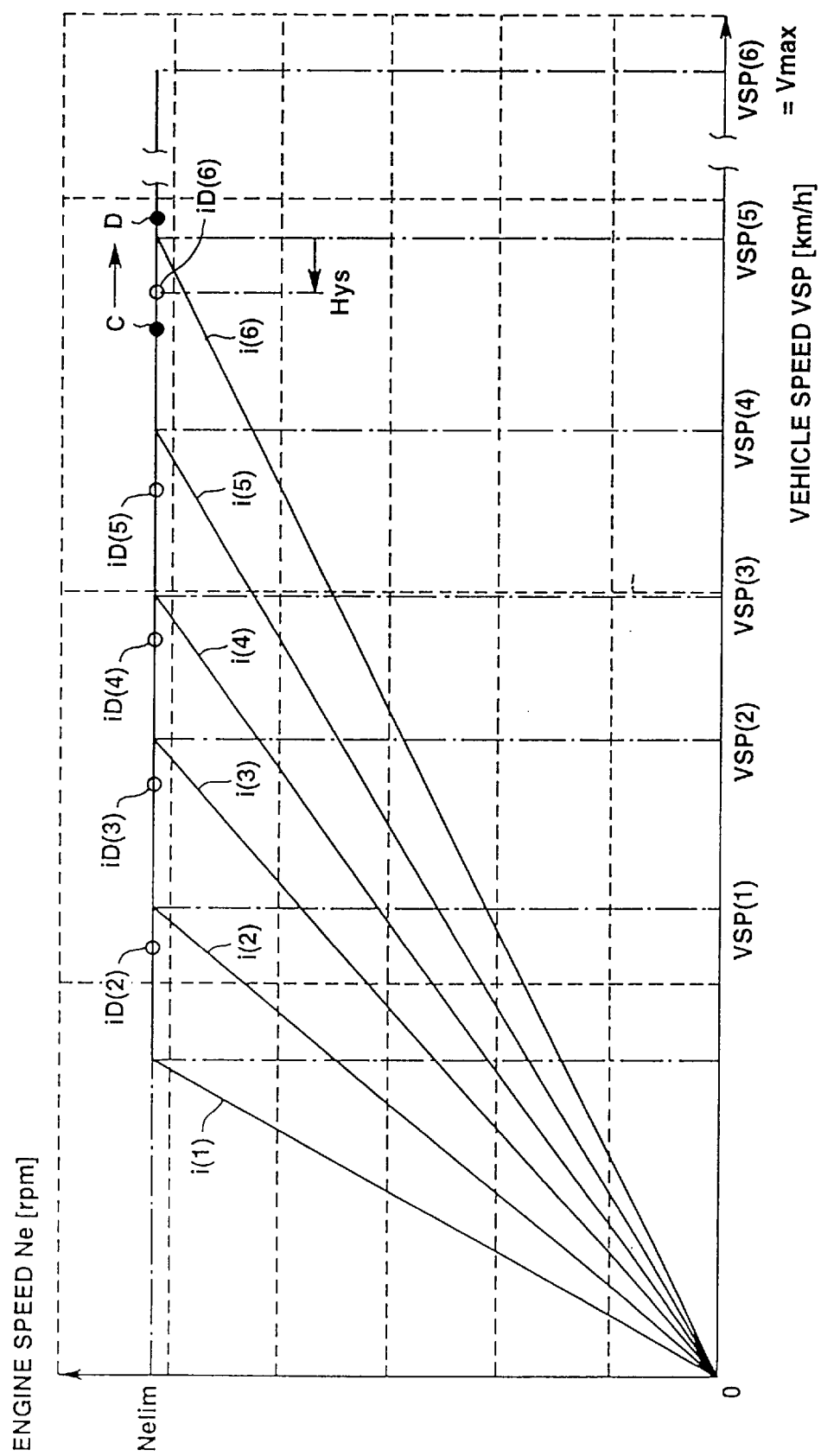
FIG. 8 is a graph showing a modified form of the shift schedule used to determine a target or desired transmission shift ratio in terms of vehicle speed and engine speed.

FIG. 7 is a flow diagram illustrating a modified form of the manual mode shift control performed for the continuously variable transmission 20. At the point 220 in FIG. 7, which corresponds to the point 106 of FIG. 5, the computer program is entered. At the point 122, a determination is made as to whether or not the shift lever 50A is operated to change the upshift switch UP from the OFF state to the ON state. If the answer to this question is "yes", then the program proceeds to the point 224 where the current speed ratio GP is changed up by one step (GP+1) and then to the point 226. The shift schedule shown in FIG. 8 provides six forward speeds from the first speed GP=1 to the sixth speed GP=6. Otherwise, the program proceeds from the point 222 to the point 226. At the point 226, a determination is made as to whether or not the shift lever 50*a* is operated to change the down switch DN from the OFF state to the ON state. If the answer to this question is "yes", then the program proceeds to the point 228 where the current speed ratio GP is changed down by one step (GP−1) and then to the point 230. Otherwise, the program proceeds to the point 230. At the point 230, a determination is made as to whether or not the engine speed Ne is greater than a predetermined acceptable value Nelim. If the answer to this question is "no", then the program proceeds to the point 232 where the target speed ratio i* is set at a speed ratio value i(GP) corresponding to the speed ratio GP demanded by the driver's operation of the shift lever 50A. Following this, the program proceeds to the end point 248.

If the engine speed is equal to or greater than the predetermined acceptable value Nelim, then the program proceeds to the point 234 where the central processing unit calculates a target speed ratio value i* as i*=K×Nelim/VSP where K is a predetermined value K, Nelim is the predetermined acceptable engine speed value and VSP is the sensed vehicle speed value. At the point 236, a variable n is set at the current speed ratio GP. At the point 238 in the program, a determination is made as to whether or not the sensed vehicle speed value VSP is higher than an upper limit VSP(n) determined by the current speed ratio GP. If the answer to this question is "yes", then the program proceeds to the point 240 where one is added to the variable n so as to increase the speed ratio GP by one step and then the program is returned to the point 238. Otherwise, the program proceeds to another determination step at the point 242. This determination is as to whether or not the vehicle speed is less than the difference of a hysteresis factor Hys from the last upper vehicle speed value VSP(n-1). The hysteresis factor Hys is set for each of the speed ratios. If the answer to this question is "yes", then the program proceeds to the point 244 where one is subtracted from the variable n and then the program is returned to the point 242. Otherwise, the program proceeds to the point 246 where the variable n is used to set the speed ratio GP again. Following this, the program proceeds to the end point 248.

This modification is substantially the same as the embodiment of FIG. 6 except for the points 242 and 244 of FIG. 7. In this modification, the vehicle speed VSP is compared hysteretically with a higher reference value VSP(n) when the vehicle speed VSP is increasing and with a lower reference value VSP(n-1)-Hys when the vehicle speed VSP is decreasing. This is effective to prevent hunting or the repeated speed ratio changes in a short time. It is now assumed that the vehicle is running with the engine speed Ne not higher than the acceptable value Nelim and the speed ratio GP set at the fifth speed (n=5), as indicated by the point C of FIG. 8. When the vehicle speed VSP exceeds the upper vehicle speed limit value VSP(5), the shift control unit 40 detects it (point 238) and increases the variable n (=5) as n=n+1 (=6) at the point 240. In this case, the sixth speed is set for the speed ratio GP at the point 246 since the answer to the question inputted at the point 242 is "no". Even when the vehicle speed VSP decreases below the upper vehicle speed limit value VSP(5), the answer to the question inputted at the point 242 is "no" and the sixth speed (n=6) is retained as long as the vehicle speed VSP is above VSP(5)-Hsy. When the vehicle speed VSP decreases below the VSP(5)-Hsy due to load fluctuation, the answer to the question inputted at the point 238 is "no" and the answer to the question inputted at the point 242 is "yes". As a result, the variable n (=6) is decreased as n=n-1 (=5) at the point 244. In this case, the fifth speed is set for the speed ratio GP at the point 246.

While this invention has been described in connection with a specific embodiment thereof, it is evident that many alternatives, modifications and variations will be apparent to those skilled in the art. For example, although the invention has been described in connection with a six speed transmission, it is to be understood that the number of the forward speed ratios is not limited in any way to six. Although the invention has been described in connection with a toroidal type transmission, it is to be understood, of course, that the invention is also applicable to a belt type transmission. Although the invention has been described in connection with upshift and downshift switches UP and DN associated with the shift lever, it is to be noted that the upshift and downshift switches may be provided on the steering wheel, the instrument panel or the like. Accordingly, it is intended to embrace all alternatives, modifications and variations that fall within the scope of the appended claims.

What is claimed is:

1. An apparatus for controlling a continuously variable transmission for use with an automotive vehicle including an engine and wheels, the transmission being operable at a speed ratio changed in a plurality of steps for transmitting a drive from the engine to the wheels, comprising:

sensor means for sensing vehicle operating conditions including engine speed and vehicle speed;

means operable in a manual shift control mode for producing an upshift command in response to a driver's upshift demand and a downshift command in response to a driver's downshift demand;

means for producing an upshift from a current shift position to another shift position one step higher than the current shift position in response to the upshift command and a downshift from the current shift position to another shift position one step lower than the current shift position in response to the downshift command;

means for setting the speed ratio at a predetermined speed ratio for the current shift position;

means for correcting the speed ratio to keep the engine speed at or below a predetermined acceptable value;

means for selecting a first vehicle speed limit value for the current shift position from predetermined first vehicle speed limit values for respective shift positions, wherein the first vehicle speed limit value for the current shift position is greater than a vehicle speed that occurs when the speed ratio is set at the predetermined speed ratio for the current shift position and the engine speed is at the predetermined acceptable value; and means for producing an upshift from the current shift position to another shift position one step higher than the current shift position when the engine speed is at the acceptable value and the vehicle speed exceeds the first vehicle speed limit value selected for the current shift position.

2. The shift control apparatus as claimed in claim 1, further including:

means for selecting a second vehicle speed limit value for the current shift position, wherein the second vehicle speed limit value for the current shift position is smaller than the first vehicle speed limit value selected for the current shift position; and means for comparing the vehicle speed with the second vehicle speed limit value selected for the current shift position to produce a downshift from the current shift position to another shift position one step lower than the current shift position when the engine speed is at the acceptable value and the vehicle speed decreases below the second vehicle speed limit value selected for the current shift position.

3. The shift control apparatus as claimed in claim 1, wherein the first vehicle speed limit value selected for the current shift position is equal to a vehicle speed that occurs when the speed ratio is set at a predetermined speed ratio for the shift position one step higher than the current shift position and the engine speed is at the predetermined acceptable value.

4. The shift control apparatus as claimed in claim 2, wherein the second vehicle speed limit value selected for the current shift position is less than a predetermined first vehicle speed limit value for the shift position one step lower than the current shift position.

* * * * *